Nov. 20, 1928.
F. A. STEVENSON
1,692,392
PERPETUAL CALENDAR
Filed Nov. 2, 1927
2 Sheets-Sheet 1
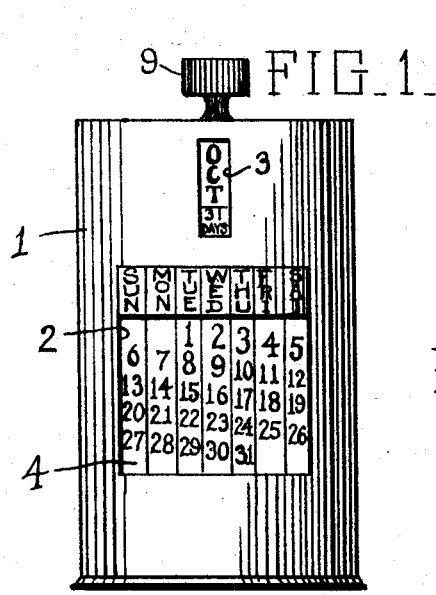
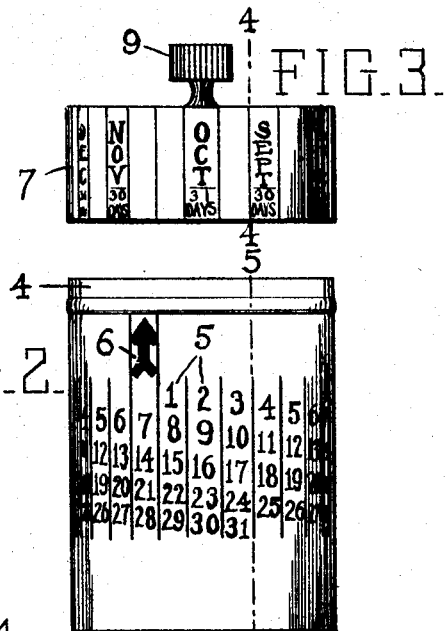
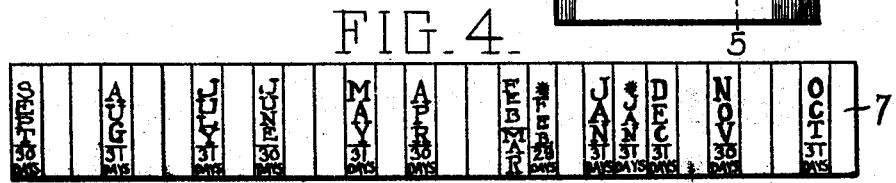
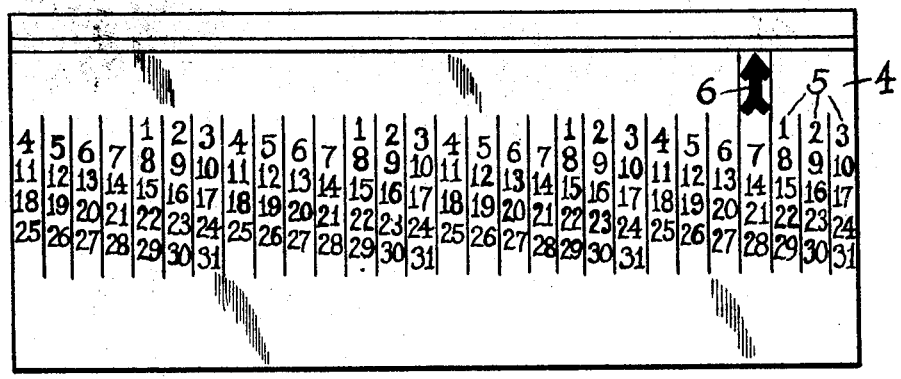
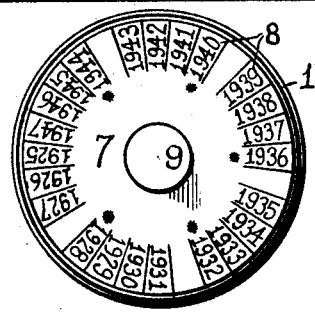
Inventor
Faye A. Stevenson.

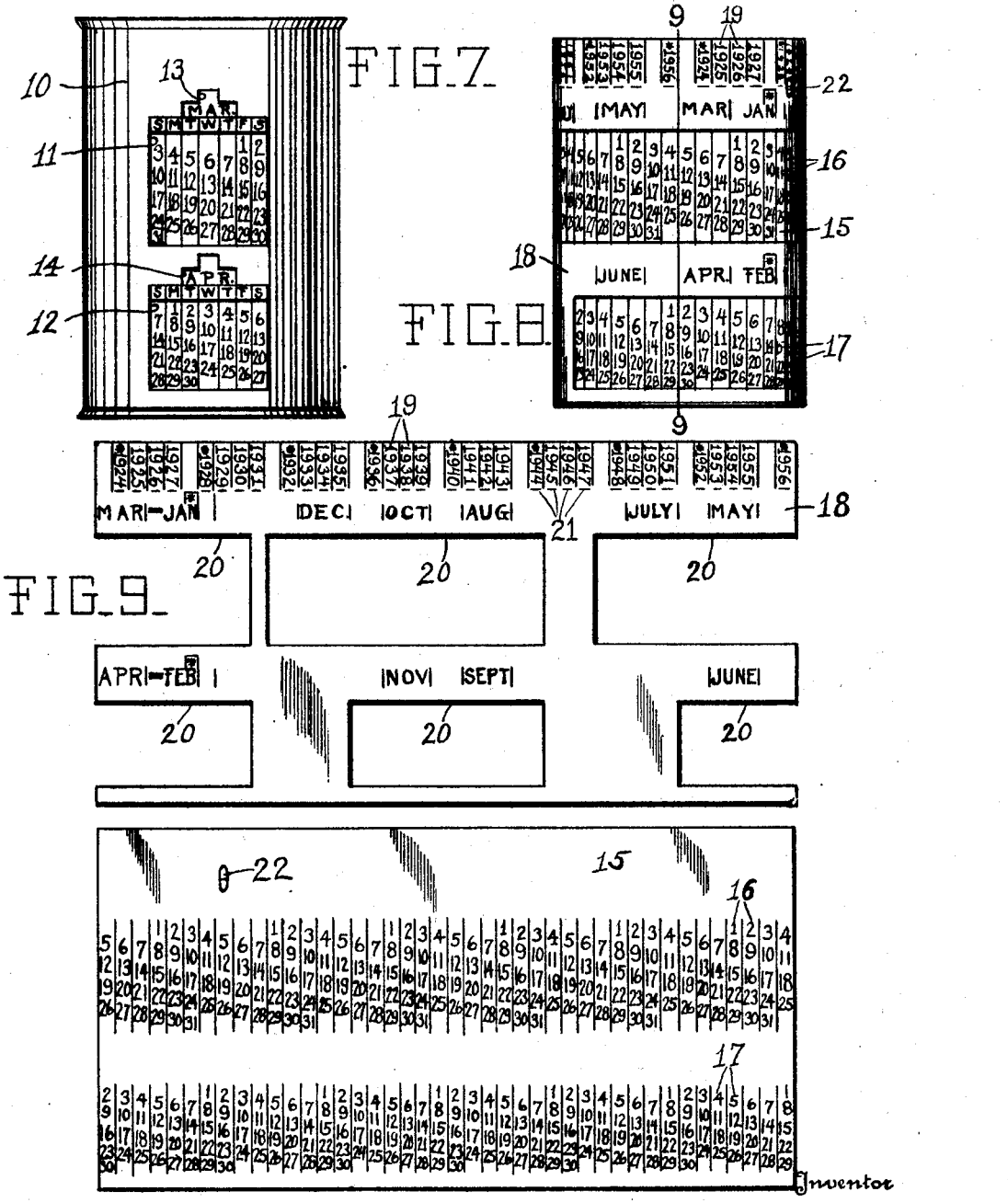

Patented Nov. 20, 1928.

1,692,392

UNITED STATES PATENT OFFICE.

FAYE A. STEVENSON, OF LANCASTER, OHIO.

PERPETUAL CALENDAR.

Application filed November 2, 1927. Serial No. 230,404.

This invention relates to improvements in calendars and particularly to those that are perpetual or continuous in nature.

One object of this invention is to provide a calendar which will be easy to use and simple to adjust.

Another object is to provide a novel device by means of which the calendar for different months in different years may be referred to easily.

Another object of this invention is to provide a calendar of this nature which will be so constructed that the calendar for different months will exhibit properly either thirty or thirty-one days.

In the accompanying drawings similar reference numbers designate similar parts.

Figure 1 is a front view of this invention.

Figure 2 is a side view of the inner cylinder removed from the outer shell and with the movable part removed.

Figure 3 is a side view of the movable part of the inner cylinder detached from the cylinder.

Figure 4 is a view of the side of the movable part as it would appear cut on the line 4—4 in Figure 3 and opened out flat.

Figure 5 is a view of the inner cylinder without the movable part as it would appear cut on the line 5—5 in Figure 2 and opened out flat.

Figure 6 is a top view of Figure 1.

Figure 7 is a front view of another form of my invention.

Figure 8 is a side view of the inner cylinder removed from the outer shell and with the movable part attached.

Figure 9 is a view of the movable part as it would appear cut on the line 9—9 in Figure 8 and opened out flat.

Figure 10 is a view of the inner cylinder without the movable part as it would appear cut on the line 9—9 of Figure 8 and opened out flat.

Referring to the drawings in detail and particularly to the form of my invention illustrated in Figures 1 to 6 inclusive, an outer shell 1 is provided with a number opening 2 and a month opening 3. Revolvably positioned inside the outer shell is an inner cylinder 4 provided with numerals 5 arranged thereon so that they will be adapted for exposure through the opening 2 in the outer shell when the inner cylinder is revolved. The numerals 5 are arranged in consecutive order from 1 to 31 inclusive as shown especially in Figure 5. A year-indicating mark or arrow 6 is provided on the cylinder 4.

The inner cylinder 4 has a movable part 7 bearing legends denoting the months of the year arranged on the sides so that they will be exposed through the slot 3 in the outer shell when the cylinder 4 is turned. The movable part 7 is further provided on its top with year numerals 8 as shown in Figure 6. A knob 9 is attached to the movable part 7 with which the cylinder 4 may be revolved when the movable part is pressed over the top of the cylinder.

To use the calendar the inner cylinder 4 is removed from the outer shell 1 and the movable part 7 is turned until the year-indicating mark 6 points upward to the desired year numerals 8 on the top of the movable part. The movable part is then pressed down over the top of the cylinder 4 and is held in place by friction. The cylinder is then placed inside the outer shell and revolved until the desired month legends are exposed through the month opening 3 in the outer shell. The calendar for that month is then shown below in the opening 2 and below the names of the days of the week which are preferably provided adjacent the upper edge of the number slot. To adjust the calendar for the next month or any month during the year the inner cylinder is revolved until the proper month legend appears in the opening 3.

For example, to set the calendar for October 1929 the movable part 7 is turned in relation to the inner cylinder until the year-indicating mark 6 is pointing to the year numerals 1929 on the top of the movable part. The inner cylinder is placed in the outer shell and revolved until the month legend "Oct" appears in the opening 3 in the outer shell. The correct calendar then appears below in the opening 2.

The leap years are indicated by asterisks. During January and February of leap years the inner cylinder must be revolved so that the special "*Jan" and "*Feb" month legends designated in this case with an asterisk as shown in Figure 5, are exposed in place of the regular month legends "Jan" and "Feb." Although the year numerals 8 shown in Figure 6 on the top of the movable part 7 only extend from 1925 to 1947 the calendar can be operated perpetually by simply turning the movable part 7 forward one space in relation to the inner cylinder for each year and two spaces on leap years, and therefore the year numerals may be dispensed with or ignored in the operation of the calendar.

In the form of my invention shown in Figures 7 to 10 inclusive, the outer shell 10 is provided with an upper number opening 11 and a lower number opening 12. An upper month opening 13 is located close to the number opening 11 and a lower month opening 14 is located close to the number opening 12. An inner cylinder 15, revolvably positioned inside the outer shell 10, is provided with an upper series of numerals 16 arranged thereon so that they will be adapted for exposure through the upper number opening 11 and a lower series of numerals 17 arranged thereon so that they will be adapted for exposure through the lower number opening 12. The series of numerals 16 are arranged in consecutive order running from 1 to 31 inclusive and the series of numerals 17 are in consecutive order running from 1 to 30 inclusive, as shown in Figure 10.

The inner cylinder 15 is provided with a movable part 18 having legends denoting the months of the year arranged so that they will be exposed through the openings 13 and 14 when the inner cylinder is turned. The movable part 18 is also provided with year numerals 19. Slots 20 in the movable part are so positioned as to permit the numerals 16 and 17 to be exposed through them at the proper time to show the calendar for the months in the openings 11 and 12. A row of small slots 21 are provided adjacent each of the year numerals 19 and a pin 22 is carried by the inner cylinder for insertion in any of these slots.

To use this form of my invention, the movable part is turned so that the desired year numeral is over the pin 22 in the cylinder 15. The pin is then inserted through the slot 21 adjacent the desired year numerals and the calendar is thus set for that year. The inner cylinder 15 is then placed in the outer shell 10 and revolved so that the desired month legend appears in one of the two month openings. The calendar for that month will then be exhibited in the number opening directly below the month opening exhibiting the month legend.

The leap years are indicated by an asterisk. For January and February on leap years the cylinder 15 is revolved so that the asterisk shown above the month legends "Jan" and "Feb" will appear in the upper part of the month openings 13 and 14.

This form of my invention usually exhibits two months at a time and, except for the month of February, it always shows the monthly calendar with the exact number of days in each month, either thirty or thirty-one.

In both forms of my invention it is seen that by turning the inner cylinder in one direction the months will be exhibited in proper order. The years are in numerical order and the calendar can be changed from year to year by a very slight adjustment. Besides its use as a perpetual calendar it is possible with this invention to refer easily to any date in past or future years without making any calculations, for by simply setting the calendar at the desired year as explained above the calendar for any month during that year can be obtained. The interior of the calendar may be adapted for use as a money bank or as a holder for pencils and the like.

It is obvious that certain changes may be made in the shape, arrangement and details of my invention without sacrificing any of the advantages or departing from the scope of the subjoined claims.

Having thus described my invention, I claim:—

1. A calendar comprising an outer shell having openings therein, a cylinder revolvably positioned inside said outer shell provided with numerals denoting days of the month arranged in numerical order and in spiral groups, said numerals extending entirely around the cylinder, said cylinder further adapted to carry legends indicating the months of the year, said month numerals and month legends being so arranged as to be exposed through the said openings in the outer shell when the cylinder is revolved and so arranged as to be turned together in one continuous direction in relation to the outer shell for exhibiting the monthly calendars in proper order throughout the year.

2. A calendar comprising an outer shell having openings therein, a cylinder revolvably positioned inside said outer shell and provided with numerals denoting days of the month arranged in numerical order and in spiral groups, said numerals extending entirely around the cylinder, the numeral 1 in one group being arranged directly over the numeral 8 in the next group and providing perpendicular number groups, a movable part carried by the said cylinder provided with legends denoting the months of the year, said month numerals and month legends being visible through the said openings in the outer shell when the cylinder is revolved, the movable part being adapted to be turned for the distance of one perpendicular number group at a time with relation to the cylinder for changing from one year to another and both the movable part and the cylinder being adapted to be turned together intermittently in the same direction in relation to the outer shell for exhibiting the monthly calendars in proper order throughout the year.

3. A calendar of the character described comprising an outer shell having openings therein, a cylinder revolvably positioned inside said outer shell and provided with numerals denoting days of the month, a movable part carried by the cylinder provided with legends denoting the months of the year, said month numerals and month legends being so positioned as to be visible through the said openings in the outer shell when the cylinder is revolved, the movable part further provided with a series of year designations arranged consecutively thereon, said movable part being adapted to be turned in relation to the cylinder for changing the setting of the calendar from one year to another, and both the movable part and the cylinder adapted to be turned together in relation to the outer shell for exhibiting the monthly calendars in proper order throughout the year.

4. A calendar comprising an outer shell having month openings and number openings, each of said month openings being located adjacent one of the number openings, said outer shell having a group of characters indicating the days of the week arranged consecutively adjacent the number openings, a revolvable cylinder positioned inside said outer shell and provided with numerals indicating days of the month, said month numerals being in numerical order extending around the cylinder and being visible in the said number openings when the cylinder is revolved, said cylinder adapted to carry legends indicating the months of the year, said month legends being visible in the month openings when the cylinder is revolved and said month numerals and month legends being so arranged as to be turned together intermittently in the same direction in relation to the outer shell to exhibit the monthly calendars in proper order throughout the year.

5. A calendar comprising an outer shell having an upper month opening, an upper number opening, a lower month opening and a lower number opening, a group of characters indicating the days of the week arranged consecutively adjacent to the said number openings, a revolvable cylinder positioned inside the said outer shell provided with a series of numerals arranged in spiral groups running from 1 to 31 inclusive adapted to appear through the upper number opening when the cylinder is revolved, and said cylinder further provided with a second series of numerals arranged in spiral groups running from 1 to 30 inclusive adapted to appear through the lower number opening when the cylinder is revolved, the numerals in both series indicating days of the month, a movable part carried by the cylinder provided with legends denoting the months of the year, said month legends being adapted to be exposed through the said month openings and to cooperate with the month numerals in the adjacent number opening in exhibiting the monthly calendars in proper order when the cylinder is revolved, the months containing 31 days being adapted to be exposed in the upper number opening and the months containing 30 days being adapted to be exposed in the lower number opening, said movable part further provided with a series of year numerals arranged consecutively thereon, the movable part being adapted to be turned in relation to the cylinder for changing the setting of the calendar from one year to another.

6. A calendar comprising an outer shell having month openings and number openings, each of said month openings being located adjacent one of the number openings, said outer shell having a group of characters indicating the days of the week arranged consecutively adjacent the number openings, a revolvable cylinder positioned inside said outer shell and provided with numerals indicating days of the month, said month numerals being in numerical order and extending entirely around the cylinder and being visible in the said number openings when the cylinder is revolved, a movable part carried by the cylinder provided with legends indicating the months of the year, said month legends being adapted to be exposed through the said month openings and to cooperate with the month numerals in the adjacent number opening in exhibiting the monthly calendars in proper order throughout the year when the cylinder and movable part are turned together intermittently in one continuous direction, said movable part further provided with a series of year designations arranged thereon, said movable part being adapted to be turned step by step in relation to the cylinder for changing the setting of the calendar from one year to another.

7. A calendar comprising an outer shell having an upper month opening, an upper number opening, a lower month opening and a lower number opening, a revolvable cylinder positioned inside the said outer shell provided with a series of numerals arranged in groups running from 1 to 31 inclusive adapted to appear through the upper number opening when the cylinder is revolved, and said cylinder further provided with a second series of numerals arranged in groups running from 1 to 30 inclusive adapted to appear through the lower number opening when the cylinder is revolved, the numerals in both series indicating the days of the month, a movable part carried by the cylinder provided with legends denoting the months of the year, said month legends being adapted to be exposed through the said month openings and to cooperate with the month numerals in the adjacent number opening in exhibiting the monthly calendars in proper order when the cylinder is revolved, the months containing 31 days being adapted to be exposed in the upper number opening and the months containing 30 days being adapted to be exposed in the lower number opening, the movable part being adapted to be turned in relation to the cylinder for changing the setting of the calendar from one year to another.

8. A calendar comprising an outer shell having an upper month opening, an upper number opening, a lower month opening and a lower number opening, a group of characters indicating the days of the week arranged consecutively adjacent to the said number openings, a revolvable cylinder positioned inside the said outer shell provided with a series of numerals arranged in spiral groups running from 1 to 31 inclusive adapted to appear through the upper number opening when the cylinder is revolved, and said cylinder further provided with a second series of numerals arranged in spiral groups running from 1 to 30 inclusive adapted to appear through the lower number opening when the cylinder is revolved, the numerals in both series indicating days of the month and extending entirely around the cylinder, said cylinder carrying means for indicating the months of the year, said month indicating means being visible in the month openings when the cylinder is revolved.

9. A calendar comprising an outer shell having month openings and number openings, each of said month openings being located adjacent one of the number openings, said outer shell having a group of characters indicating the days of the week arranged consecutively adjacent the number openings, a revolvable cylinder positioned inside said outer shell and provided with numerals indicating days of the month, said month numerals being in numerical order and extending entirely around the cylinder and being visible in said number openings when the cylinder is revolved, a movable part carried by the cylinder provided with means for indicating the months of the year, said month-indicating means being adapted to be exposed through the said month openings and to cooperate with the month numerals in the adjacent number openings for exhibiting monthly calendars in proper order when the cylinder is revolved, and said movable part being adapted to be turned in relation to the cylinder for changing the setting of the calendar from one year to another.

10. A calendar of the character described comprising an outer shell having openings therein, a cylinder revolvably positioned inside said outer shell and provided with numerals denoting days of the month, said numerals being arranged entirely around the cylinder in a number of spiral groups and in numerical order, the numeral 1 in one group being arranged directly over the numeral 8 in the next group, a movable part carried by the cylinder provided with legends indicating the months of the year, said month legends being so arranged as to cooperate with the month numerals in exhibiting the monthly calendars automatically in proper order when the cylinder and the movable part are turned together in one continuous direction throuhout the year, and said month legends and month numerals being adapted to be shifted in relation to each other to change the setting of the calendar from one year to another whereby the calendar will be set for the entire year.

FAYE A. STEVENSON.